Patented Feb. 21, 1950

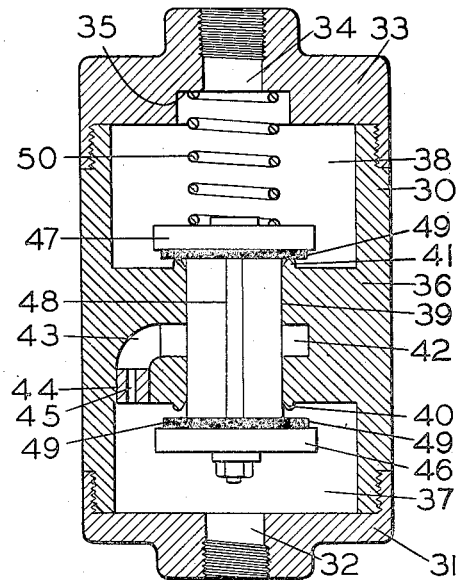
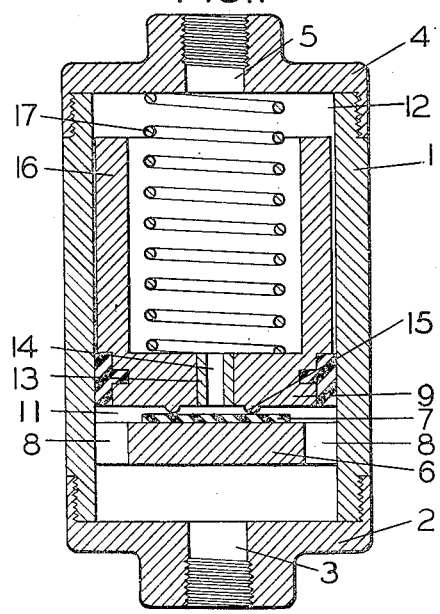

2,498,482

UNITED STATES PATENT OFFICE 2,498,482

CHECK VALVE DEVICE

Norman G. Cadman and Bertram C. Vigor, London, England, assignors, by mesne assignments, to The Westinghouse Air Brake Company, Wilmerding, Pa., a corporation of Pennsylvania Application January 14, 1947, Serial No. 721,939
In Great Britain May 14, 1946

1 Claim. (Cl. 251—118)

This invention relates to fluid pressure control apparatus and more particularly to improvements in check valve devices for use therein.

The usual check valve device comprises a valve member which is arranged to unseat by action of fluid under pressure. It often occurs that once the valve member has been so unseated, the pressure of fluid substantially equalizes around it and thus allows it to temporarily reseat. A continued repetition of alternate unseating and seating of the valve member, termed chattering or pounding, during normal operation of the check valve device causes undue wear of the valve member and associated parts in the check valve device. Such action may also produce fluid pressure pulsations which may be objectionable in a fluid pressure system.

One object of the invention is to provide a fluid pressure check valve device which will be free of chattering or pounding and the consequent objections thereto as mentioned above.

Another object of the invention is to provide a check valve device comprising a valve member which, when opened by pressure of fluid, will be positively maintained in its open position until it is intended that it move to a closed position.

Still another object of the invention is to provide a check valve device such as defined in the above objects which is relatively simple in construction.

Other objects of the invention will hereinafter be apparent from the following more detailed description thereof.

In the accompanying drawing; Fig. 1 is a diagrammatic sectional view of a check valve device embodying one form of the invention; and Fig. 2 is a diagrammatic sectional view of a check valve device embodying another form of the invention.

Description—Fig. 1

Referring to Fig. 1 in the drawing, the check valve device comprises a casing 1 in which there is a bore, one end of which is closed by a cap 2 which is provided with an inlet passage 3, and the opposite end of which is closed by a cap 4 which is provided with an outlet passage 5. Transversely disposed in the bore is a rigid valve seat member 6 with a resilient valve seat gasket 7 mounted thereon. The member 6 is also provided with through ports 8 outside the seat gasket 7.

Slidably mounted in the bore at one side of the member 6 is a piston valve 9, constituting a check valve for preventing flow of fluid under pressure from the outlet passage 5 to the inlet passage 3. At one side of the piston valve 9 is an inlet chamber 11 which is in constant open communication through ports 8 with the inlet passage 3, and at the opposite side of said piston valve is a spring chamber 12 which is in constant open communication with the outlet passage 5. The piston valve 9 is provided with a choke 13 having a restricted passage 14 extending through the valve. A sealing rib 15, encircling the passage 14, projects from the outer face of the piston valve 9 for sealing cooperation with the seat gasket 7. An annular guide 16 integral with the piston valve 9 projects into the spring chamber 12. A compression control spring 17, disposed in the chamber 12, projects into the guide 16 to abut against a face of the piston valve 9 for urging it toward the seat member 6.

Operation—Fig. 1

When the check valve device is connected in a fluid pressure line, that is, between an inlet or supply line and an outlet or discharge line, fluid under pressure from a suitable source will enter the inlet passage 3, pass through the ports 8 in the valve seat member 6 into the inlet chamber 11, and exert a force on that surface on the bottom face of the valve 9 which lies outside the sealing rib 15, assuming said valve is in its seated position as shown in Fig. 1. So long as the force of fluid under pressure thus acting on the valve 9 is insufficient to overcome the action of the control spring 17, the valve will remain seated with sealing rib 15 in sealing engagement with the gasket 7.

When the pressure of fluid acting on the valve 9 in the above manner becomes great enough to overcome the opposing action of the spring 17, it moves said valve from its seat and parts the sealing rib 15 from the gasket 7, allowing the fluid under pressure in chamber 11 to flow through the restricted passage 14, into the chamber 12 and to the outlet passage 5.

The restricted passage 14 is of such a size that when fluid at a pressure sufficient to unseat the valve 9 flows through it to chamber 12, a sufficient differential between the fluid pressures in chambers 11 and 12 is provided to positively move said valve under opposition of the spring 17 to an open position, which may be defined by contact of the guide 16 with the cap 4, and to then positively maintain said valve in said open position as long as said differential exists.

When the pressure of the fluid entering the valve device is reduced below a predetermined degree, the differential between the fluid pressures in chambers 11 and 12 across the valve 9 will be reduced so that the resultant force thereof action on said valve is less than the opposing force of the spring 17, whereupon said spring will move said valve to its seated position, in which position it is shown in Fig. 1.

*Description—Fig. 2*

In the form of the invention shown in Fig. 2, the check valve device comprises a hollow casing 30 closed at one end by a cap 31 which is provided with an inlet passage 32, and closed at the other end by a cap 33 which is provided with an outlet passage 34. An annular shoulder 35, provided in the cap 33, is shown encircling the passage 34.

A partition 36, which may be formed integral with the casing, divides the interior of the casing 30 into an inlet chamber 37 which is open to the inlet passage 32 and an outlet chamber 38 which is open to the outlet passage 34. Extending through the partition 36 is a bore 39, one end of which opens into the inlet chamber 37, while the opposite end opens into the outlet chamber 38. Two seat ribs 40 and 41 are provided on the partition 36, which ribs encircle opposite openings of the bore 39 and project into the inlet chamber 37 and the outlet chamber 38, respectively.

An annular recess 42 is provided in the partition 36 around the bore 39, which recess is open to the inlet chamber 37 by way of a passage 43 in said partition. A choke 44 is provided in the passage 43 which choke comprises a restricted passage 45.

Two valves, 46 and 47, contained respectively in chambers 37 and 38, are rigidly connected to opposite ends of a fluted valve stem 48 which is slidably mounted in the bore 39. The valves 46 and 47 are each provided with a resilient gasket 49 for sealing contact with ribs 40 and 41, respectively. The valve 47 constitutes a check valve for preventing flow of fluid under pressure from the chamber 38 to the chamber 37.

Contained in the outlet chamber 38 is a spring 50 which, cooperating with the annular shoulder 35 in the cap 33, abuts against the valve 47 to urge it toward the seat rib 41.

With the check valve device in closed position as shown in Fig. 2, the valve 47 is seated on the rib 41, closing off the bore 39 from the outlet chamber 38, and the attached valve 46 is unseated, directly opening the bore 39 to the inlet chamber 37.

*Operation—Fig. 2*

With the check valve device connected in a fluid pressure system, fluid under pressure enters the inlet passage 32 into the inlet chamber 37 and hence directly into the bore 39 to exert a force on that portion of the under face of the valve 47 that is exposed within the rib 41 which encircles said bore. So long as the force of fluid under pressure thus acting on the valve 47 is insufficient to overcome the action of spring 50, said valve remains seated on the rib 41.

When the pressure of fluid in the bore 39 is increased to a degree sufficient to cause a force acting on the valve 47 greater than the opposing force of the spring 50, said valve will be unseated, allowing fluid under pressure to flow into the outlet chamber 38.

During the initial movement of the valves 46 and 47 in a direction to open the valve 47, fluid under pressure supplied to the inlet chamber 37 flows rapidly through the bore 39 to the outlet chamber 38, said bore being supplied with fluid under pressure from said chamber 37 both directly by way of the yet unseated valve 46 and indirectly by way of the restricted passage 45, the passage 43, and the annular recess 42.

As the valve 47 moves away from the seat rib 41, the pressure of fluid on one side of said valve may substantially equalize with the pressure of fluid on the opposite side, thus tending to allow the spring 50 to force said valve 47 to reseat on the rib 41. However, during this time, the attached valve 46 is moving closer to the seat rib 40 and is thereby increasingly restricting flow of fluid under pressure by direct entrance into the bore 39 and causing increasingly more fluid under pressure to flow to the bore 39 indirectly by way of the restricted passage 45, the effect of which is to substantially increase the differential between the fluid pressures in chamber 37 and the bore 39 acting on valve 46. This action persists to maintain movement of the valve 46 and the attached valve 47 against the opposing action of the spring 50 until the valve 46 seats against the rib 40.

With the valve 46 seated, the valve 47 is open and all of the fluid under pressure flowing through the valve device now flows through the restricted passage 45 which is effective to maintain the differential in fluid pressure across the valve 46 necessary to keep it seated and consequently keep the attached valve 47 unseated.

When the pressure of fluid entering the chamber 37 of the valve device is reduced below a predetermined degree, the differential in fluid pressure across the valve 46, provided by flow of fluid under pressure thru the restricted passage 45, is so reduced that the resultant force thereof acting on said valve becomes less than the opposing force of the spring 50 which then acts to seat the valve 47 and to unseat the attached valve 46.

*Summary*

It will now be seen that in both embodiments of the invention the check valve when open will be positively held open and will not chatter or pound on its seat or cause a pulsating flow due to such action.

Having now described the invention, what we claim as new and desire to secure by Letters Patent is:

A check valve device comprising a casing having a fluid inlet chamber and a fluid outlet chamber and partition means separating said chambers, said partition means having a bore connecting said chambers and a valve seat at each of the opposite ends of said bore, a valve in each of said chambers arranged to cooperate with the respective valve seat to close communication between the respective chamber and bore, a stem extending thru said bore connecting said valves to each other in spaced relation a distance exceeding the length of said bore, spring means acting on said valves for seating the valve in said outlet chamber and for unseating the other valve, and fluid conducting means including a choke connecting said inlet chamber to said bore.

NORMAN G. CADMAN.
BERTRAM C. VIGOR.

REFERENCES CITED

The following references are of record in the file of this patent:

UNITED STATES PATENTS

| Number | Name | Date |
| --- | --- | --- |
| 1,718,350 | Greenwald | June 25, 1929 |
| 2,353,161 | Heigis | July 11, 1944 |